March 1, 1927.
E. A. RUSSELL
FLEXIBLE PIPE JOINT
Original Filed Jan. 9, 1925
1,619,218
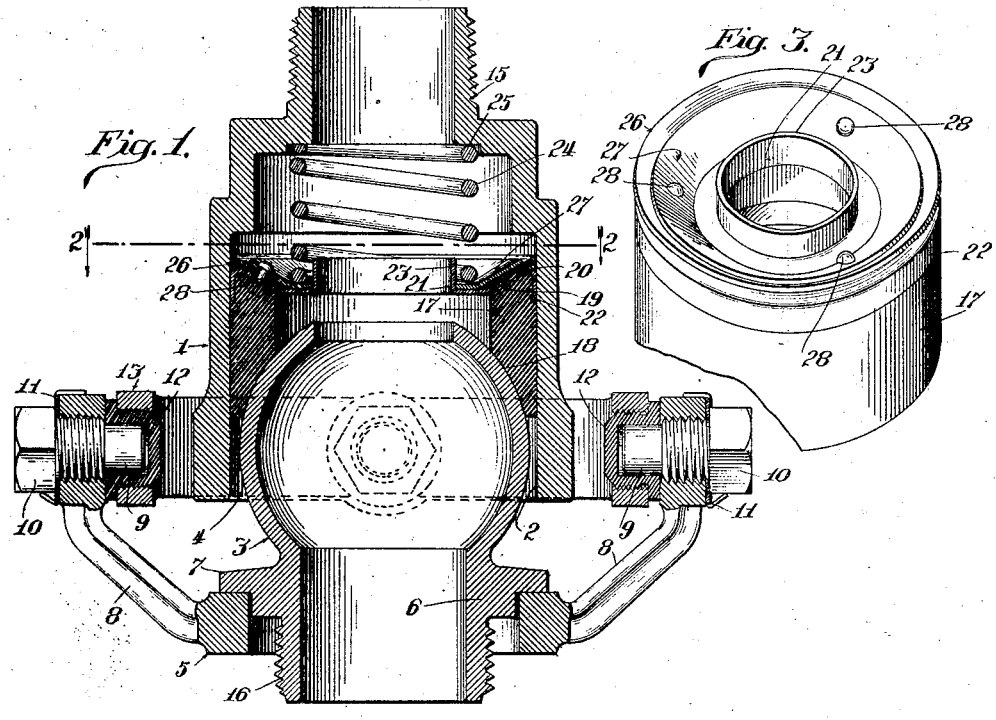
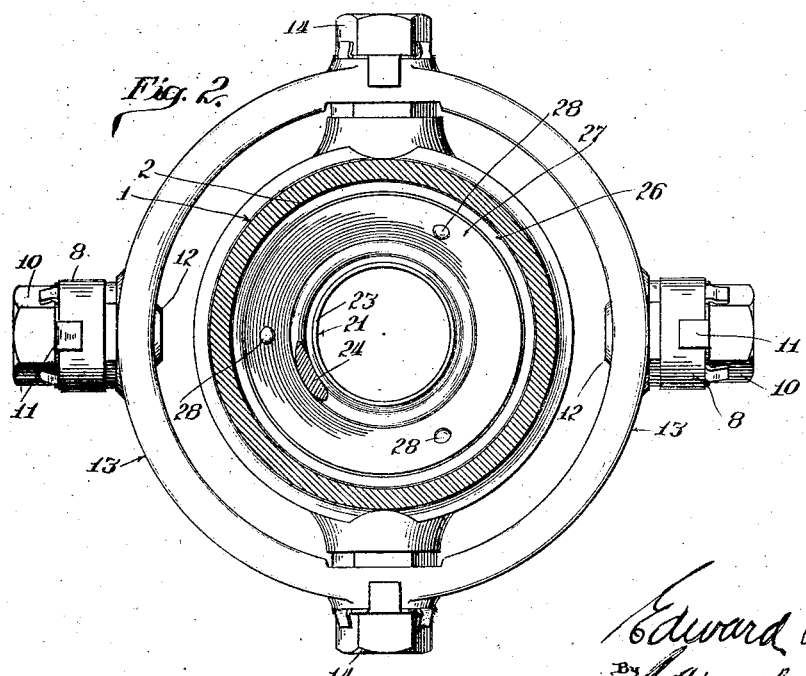
Inventor.
Edward A. Russell
By Barnett [Attorneys]

Patented Mar. 1, 1927.

1,619,218

UNITED STATES PATENT OFFICE.

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK.

FLEXIBLE PIPE JOINT.

Application filed January 9, 1925, Serial No. 1,407. Renewed January 25, 1926.

My invention relates to a flexible pipe joint of the type comprising a socket member and a ball member arranged within, spaced slightly from the wall of the socket member and articulated with the socket member to allow universal movement as between these members, within certain limits, and the object of the invention is to provide an improved sealing device adapted to be interposed between the socket member and the inner end of the ball member for making the joints fluid-tight at all times.

The invention is intended primarily for use as a part of a flexible pipe connection between the steam or air pipes of adjacent cars of a railway train. Such a pipe connection must be freely flexible to allow for the relative angular movements of the two cars, and at the same time must maintain a fluid-tight joint. These sealing devices customarily embody a gasket, longitudinally adjustable within the socket member, and bearing against the inner end of the ball member. There are constant vibratory movements between the two members of the joint which tend to wear down the gasket, particularly the surface thereof bearing against the ball. The fluid pressure in the joint tends to force the gasket, as a wedge, into the space between the ball and socket so that wear is taken up automatically.

My present invention seeks to provide a simple and economical sealing device for use in a pipe joint of this type, which is automatically adjustable to take up wear and to accommodate itself to the angular and swivel movements of the ball and socket relative to one another, and which will at all times seal the joint between the gasket and the socket member.

Another object of the invention is to provide means for holding the gasket in contact with the ball and socket members, when the joint is not under fluid pressure.

More specifically, my improved sealing device consists of a substantially cylindrical hollow gasket member adapted to slide longitudinally through the socket member, and curved at its inner end to fit against the ball. A follower engages with the rear end of the gasket, and an annular sealing member or wiper is secured to the follower and engages with the socket member to seal the joint between the gasket and follower.

The object of the invention is to provide an improved sealing device of the type briefly described above, and described more in detail hereinafter.

Other objects and advantages of the invention will be apparent from the following detailed description of a certain approved form of apparatus embodying the principles of this invention.

In the accompanying drawing:

Fig. 1 is a central longitudinal section through one of the pipe connections, showing a preferred form of the improved sealing device installed therein.

Fig. 2 is a transverse section taken substantially on the line 2—2 of Fig. 1; and Fig. 3 is a perspective view of the sealing assembly, as used in Figs. 1 and 2.

Referring to the drawing, the pipe connection comprises a socket member 1, having a cylindrical recess or opening 2 therein, and a ball member 3 centered within the outer portion of recess 2 and having a loose working fit in this recess so that a substantial clearance space 4 exists between all portions of the ball and the surrounding portion of the socket member. Articulating means are provided to hold the ball member 3 centered within socket member 1, while at the same time allowing free, relative, angular and preferably rotative movements between these members. For this purpose, an annular collar 5 is swivelled upon a neck portion 6 of the ball member 3, behind a shoulder 7 projecting outwardly from this neck portion. Arms 8 extending outwardly at diametrically opposite points from the collar 5 project forwardly around the ball member. Pivot studs 9, at the ends of the bolts 10, are screwed into the outer ends of arms 8, the studs 9 having a common center line extending through the center of ball 3. Suitable nut locks 11 maintain the pivot studs in place in the arms 8. Studs 9 are pivoted in bushings 12 of bronze or other suitable bearing metal, screwed into the ring member 13 which loosely surrounds the outer end of socket member 1. The ring 13 is pivoted to the socket member 1 on an axis also passing through the center of ball 3 and at right angles to the axes of the studs 9, as already described. For this purpose, bolts 14 are screwed into the ring 13 at points spaced 90° from the bushings 12, as previously described. These bolts 14 have pivot studs on their inner ends, similar to the studs 9, which are rotatable in bushings similar to the bushings 12 screwed into the body portion of socket member 1. By means of the mechanism just described, the ball member 3 is positively centered within the socket member 1, but is permitted a universal angular movement, as well as a free rotative movement, at all times.

The socket member 1 has a threaded tubular extension 15 adapted to be engaged with the adjacent portion of the flexible piping, and the neck portion 6 of the ball member 3 has a corresponding threaded tubular extension 16 adapted to be engaged with another section of this flexible piping.

The sealing device now to be described, forming the principal feature of the present invention, is adapted to maintain a fluid-tight joint between the ball and socket members of the flexible pipe connection at all times, without interfering with the free angular and rotative movement of the ball member within the socket. The gasket 17, formed of a hard rubber composition or other suitable material, has an outer cylindrical surface adapted to slide freely within the recess 2 in the socket member 1. One inner end of the gasket 17 is curved as shown at 18 to fit against the adjacent end of the ball member 3. At its opposite end the gasket is cut away as at 19 to engage the conical portion 20 of a metallic follower 21. This follower 21 has an outer cylindrical flange 22 extending over the adjacent end portion of the gasket, and an oppositely extending cylindrical flange 23 at its inner edge, serving as a centering device for the compression spring 24, which bears at one end against the follower and at its other end against a shoulder 25 in the socket member. A flexible ring 26 of some suitable soft material, is secured to the conical portion 20 of the follower. Preferably the inner portion of this ring 26 is clamped between the follower and a second conical plate 27 by means of rivets 28 secured through the two plates and the flexible ring. The outer peripheral edge of the ring 26 is adapted to act as a wiper pressing yieldably against the inner wall of the recess 2 in socket member 1. The steam pressure within the pipe connection, which holds the gasket 17 forcibly in place between the socket member and ball member 3, also clamps the wiper yieldably against the inner wall of the socket member and maintains a fluid-tight joint between the follower and the socket. Spring 24 assists the fluid pressure within the pipe connection in holding the gasket in operative position, and also maintains the gasket in position when the fluid pressure within the pipe is released. This device is simple and easily assembled, allows a practically unlimited longitudinal adjustment of the gasket 17, and maintains a fluid-tight joint between the gasket and the socket member at all times.

While I desire to cover herein all modifications of the disclosed embodiment of my invention within the scope of the appended claims, I do not claim herein features of the invention common to this application and an application filed February 27, 1926, Serial No. 91,150 as a division hereof, as such common invention is claimed in the divisional application.

I claim:

1. In a flexible pipe connection, a socket member having a substantially cylindrical recess, a ball member projecting within this recess, connecting means for holding the ball centered within the recess but permitting free angular movement thereof, a gasket having a slidable fit within the cylindrical recess and bearing at one end against the ball member, a follower at the other end of the gasket, and a flexible wiper secured to the follower and bearing at its outer edge against the walls of the recess.

2. In a flexible pipe connection, a socket member having a substantially cylindrical recess, a ball member projecting within this recess, connecting means for holding the ball centered within the recess but permitting free angular movement thereof, a gasket having a slidable fit within the cylindrical recess and bearing at one end against the ball member, a follower having oppositely directed cylindrical flanges at its two ends, one hooked over the rear end of the gasket, and the other serving as a spring centering device, a spring mounted between the follower and the socket member and a flexible wiper secured to the follower and bearing at its outer edge against the socket member.

3. In a flexible pipe connection, a socket member having a substantially cylindrical recess, a ball member projecting within this recess, connecting means for holding the ball centered within the recess but permitting free angular movement thereof, a gasket having a slidable fit within the cylindrical recess and bearing at one end against the ball member, a follower at the other end of the gasket consisting of a pair of annular metallic members, and a flexible wiper clamped between the members and bearing against the socket member at its outer edge.

4. In a flexible pipe connection of the ball and socket type, in which a gasket bearing against the ball member is longitudinally movable within the socket member, a follower behind the gasket having a flexible wiper to bear yieldably against the socket member.

5. In a flexible pipe connection of the ball and socket type, in which a gasket bearing against the ball member is longitudinally movable within the socket member, a follower comprising a metallic portion enclosing the rear end of the gasket and a flexible wiper secured to the metallic portion and bearing yieldably against the socket member.

6. In a flexible pipe connection of the ball and socket type, in which a gasket bearing against the ball member is longitudinally movable within the socket member, a follower comprising an annular metallic member having a cylindrical flange at its outer edge enclosing the end of the gasket, and an inwardly directed conical portion bearing against this end of the gasket, and a flexible wiper secured to the conical portion and adapted to press yieldably against the socket member.

7. In a flexible pipe connection of the ball and socket type, in which a gasket bearing against the ball member is longitudinally movable within the socket member, a follower comprising an annular metallic member having a cylindrical flange at its outer edge enclosing the end of the gasket, an oppositely directed spring-centering flange at its inner edge, and an intermediate conical portion converging inwardly in the direction of the ball member and a flexible wiper secured to the conical portion with its outer edge bearing against the socket member.

8. In a flexible pipe connection of the ball and socket type, in which a gasket bearing against the ball member is longitudinally movable within the socket member, a follower comprising an annular metallic member having a cylindrical flange at its outer edge enclosing the end of the gasket, an oppositely directed spring-centering flange at its inner edge, and an intermediate conical portion converging inwardly in the direction of the ball member, and an annular flexible wiper adapted to bear yieldably at its outer edge against the socket member, and a second conical metallic member between which and the first named conical portion the wiper is clamped.

9. In combination with a flexible pipe connection of the ball and socket type in which a gasket bearing against the ball member is longitudinally movable within the socket member, a flexible wiper on the gasket and bearing against the wall of the socket member to seal the space between the gasket and socket.

10. In combination with a flexible pipe connection of the ball and socket type in which a gasket bearing against the ball member is longitudinally movable within the socket member, a flexible wiper interposed between the gasket and the wall of the socket member to provide a seal between these members.

11. In a flexible joint, the combination of an interiorly cylindrical socket member, a ball member projecting into the socket member, articulating means for holding the ball member centered in the socket member with capacity for angular movement, an exteriorly cylindrical gasket slidably arranged within the socket member to bear against the inner end of the ball member, and a flexible wiper interposed between the gasket and socket member to seal the space between these members.

12. In a flexible joint, the combination of an interiorly cylindrical socket member, a ball member projecting into the socket member, articulating means for holding the ball member centered in the socket member with capacity for angular movement, an exteriorly cylindrical gasket slidably arranged within the socket member to bear against the inner end of the ball member, and a flexible wiper on said gasket to bear against the inner wall of the socket member.

EDWARD A. RUSSELL.